United States Patent [19]

Somerville

[11] Patent Number: 5,111,131

[45] Date of Patent: May 5, 1992

[54] COMPACT LOW NOISE LOW POWER DUAL MODE BATTERY CHARGING CIRCUIT

[75] Inventor: Thomas A. Somerville, Tuscon, Ariz.

[73] Assignee: Burr-Brown Corporation, Tucson, Ariz.

[21] Appl. No.: 621,014

[22] Filed: Nov. 30, 1990

[51] Int. Cl.⁵ .............................................. H02J 7/00
[52] U.S. Cl. ....................................... 320/32; 320/20
[58] Field of Search ................................... 320/20, 32

[56] References Cited

U.S. PATENT DOCUMENTS

| | | | |
|---|---|---|---|
| 4,031,449 | 6/1977 | Trembly | 320/2 |
| 4,137,493 | 1/1979 | Smith | 320/39 |
| 4,146,830 | 3/1979 | Foster | 320/32 |
| 4,163,934 | 8/1979 | Lawn | 320/32 |
| 4,472,672 | 9/1984 | Pacholok | 320/32 |
| 4,549,127 | 10/1985 | Taylor et al. | 320/21 |
| 4,639,655 | 1/1987 | Westhaver et al. | 320/14 |
| 4,695,784 | 9/1987 | Reynolds | 320/32 |
| 4,742,290 | 5/1988 | Sutphin et al. | 320/32 |
| 4,746,852 | 5/1988 | Martin | 320/20 |
| 4,755,735 | 7/1988 | Inakagata | 320/35 |
| 4,767,977 | 8/1988 | Fasen et al. | 320/20 |
| 4,855,663 | 8/1989 | Matsui et al. | 320/20 |
| 4,897,591 | 1/1990 | Spani | 320/32 |
| 4,959,604 | 9/1990 | Cuesta | 320/20 |

FOREIGN PATENT DOCUMENTS

| | | |
|---|---|---|
| 0147241 | 7/1985 | European Pat. Off. |
| 1276505 | 6/1972 | United Kingdom |

OTHER PUBLICATIONS

"Fast-Charging Systems for Ni-Cd Batteries", by David A. Zinder, *Design Ideas*, 1970, pp. 65-67.

*Primary Examiner*—Steven L. Stephan
*Assistant Examiner*—Thomas M. Dougherty
*Attorney, Agent, or Firm*—Cahill, Sutton & Thomas

[57] ABSTRACT

A low noise battery charger includes a rectifier to convert AC line voltage to a rectified sinusoidal voltage that is applied to a primary winding of a transformer. Another rectifier coupled to a first secondary winding applies a charging current to a battery. A switch coupled in series with the primary winding controls current therein. A rectifier coupled to another secondary winding produces a battery condition voltage. An incrementing signal synchronized with the rectified sinusoidal voltage increments a ratchet DAC until its output voltage exceeds the battery condition voltage. A low charging mode signal is produced when the battery condition voltage falls a certain amount below the DAC output voltage. Flow of current through the primary winding is controlled by operating the switch at a relatively high frequency and by producing constant turn off times for the switch and also by modulating turn on times for the switch in response to the signal indicative of primary winding current. Maximum power transfer across the transformer is thereby achieved without flyback voltage of the transformer exceeding breakdown voltage of the switch, and zero current switching is achieved.

22 Claims, 3 Drawing Sheets

COMPACT LOW NOISE LOW POWER DUAL MODE BATTERY CHARGING CIRCUIT

BACKGROUND OF THE INVENTION

The invention relates to a system for charging batteries, particularly nickel cadmium batteries. The invention relates more particularly to very small, compact battery charger circuits suitable for charging batteries of communications products without introducing electrical noise that may interfere with operation thereof.

A fully charged state of a nickel cadmium battery is achieved by controlling the charging when the terminal voltage falls or "droops" by a certain amount (for example, 100 millivolts) from its peak value during high current charging. Nickel cadmium batteries are known which are able to withstand a relatively high charging rate. A high battery charging rate is desirable in order to reduce the charging time and therefore the amount of time a battery is out of service. For a typical fast charge, a current that is numerically equal in amperes to the battery capacity in ampere hours is supplied to the battery for approximately one hour. It is known that high current charging of a nickel cadmium battery should be stopped soon after the onset of a negative rate of change of the battery voltage. There are known battery chargers that automatically sense a fully charged condition of a battery and then terminate the main charging current produced by the charger and substitute a trickle current. As the battery reaches full charge, the charging rate is reduced to a trickle charge or stopped. It is important to control the cutoff of charging so as to assure that the battery has been fully charged, and also to prevent overcharging that may damage the battery cells.

It is known that many communications products, such as portable cellular telephones, are highly sensitive to presence of electrical noise. Prior battery chargers generally introduce a substantial amount of electrical noise onto conductors connected to the terminals of the battery being charged. Furthermore, radiated high frequency interference may be picked up by rf amplifiers. If a communications product such as a portable cellular telephone is being used while its battery is being charged, such electrical noise is likely to deleteriously affect performance of the cellular telephone.

It would be highly desirable to provide a compact, low noise battery charger that could be incorporated easily in a communications product or a power cord thereof to continually charge nickel cadmium batteries whenever the power cord is connected to a source of AC line current. Prior battery chargers which are inexpensive enough for this purpose unfortunately require a long (e.g., twelve hours) charging time. More elaborate "fast" battery chargers are expensive, large, consume too much power, and/or generate too much electrical noise to be used simultaneously in most communication products.

There is a presently unmet need for a compact, very low noise, inexpensive battery charger suitable for charging nickel cadmium batteries of noise-sensitive products, while allowing such products to be used while battery charging is occurring, without noise-caused operating problems.

SUMMARY OF THE INVENTION

Accordingly, it is an object of the invention to provide a low cost, low noise, compact, highly efficient battery charging apparatus and method.

It is another object of the invention to provide such a battery charging apparatus and method which provides very fast charging of a nickel cadmium battery without causing damage due to overcharging.

It is another object of the invention to provide a very compact battery charger capable of being incorporated in a power cord and applying sufficiently low electrical noise across its output terminals or radiated from within to allow use of noise-sensitive communications products and the like while rechargeable batteries thereof are being charged.

Briefly described, and in accordance with one embodiment thereof, the invention provides a battery charger that includes a first rectifier receiving a line voltage and producing a rectified sinusoidal voltage. A transformer has a primary winding coupled to receive the rectified sinusoidal voltage, and also has first and second secondary windings. A second rectifier is coupled between the terminals of the first secondary winding and the terminals of a battery being charged. A switch is coupled between a terminal of the primary winding and a filter or other circuit that produces a signal indicative of current flowing through the primary winding. A first circuit is coupled to terminals of the second secondary winding to produce a battery condition voltage that is proportional to the voltage present between the terminals of the battery being charged. A second circuit produces a timing signal in response to the rectified sinusoidal voltage. A third circuit is coupled to the output of a ratchet DAC to compare an output voltage of the ratchet DAC to a reference voltage proportional to the battery condition voltage. The ratchet DAC performs a peak detect and hold function. The third circuit produces an incrementing signal that is synchronized with the timing signal to increment the ratchet DAC until its output voltage exceeds the reference voltage. A fourth circuit is coupled to the output of the ratchet DAC to produce a low charging mode signal when the battery condition falls a predetermined threshold voltage below the DAC output voltage after a peak of the battery condition voltage has been attained. A fifth circuit is coupled to receive the low charging mode signal and the signal indicative of current flowing through the primary winding in order to produce a control signal. The control signal is applied to the switch to control flow of current through the primary winding in accordance with the battery sense voltage. The control signal applied to the switch is controlled to produce a very low duty cycle when the battery charger is in its low charging current mode. When the battery charger is in its high charging current mode, the on time of the switch is modulated continuously between the valleys and peaks of the rectified sinusoidal voltage in order to keep voltage across the switch from exceeding its breakdown voltage while obtaining maximum charging current to the battery. This is accomplished by circuitry that produces constant turn off times for the switch and variable turn on times for the switch in response to the signal indicative of current in the primary winding. This technique also accomplishes zero voltage, zero current switching of the switch, minimizing switching noise and power dissipation in the switch. The constant turn off time is set to one-half of the resonant frequency of the primary winding circuit to accomplish the zero voltage switching. The primary flyback voltage therefore has a half sine waveform returning to zero before the switch is turned on for the next cycle. Power loss in the switch is minimized, and the noise generated by the flyback voltage waveform is concentrated at the relatively high resonant frequency, with less energy at higher multiples of the frequency then would be the case with non-sinusoidal waveforms.

DETAILED DESCRIPTION OF THE PREFERRED EMBODIMENT

Figure 1:
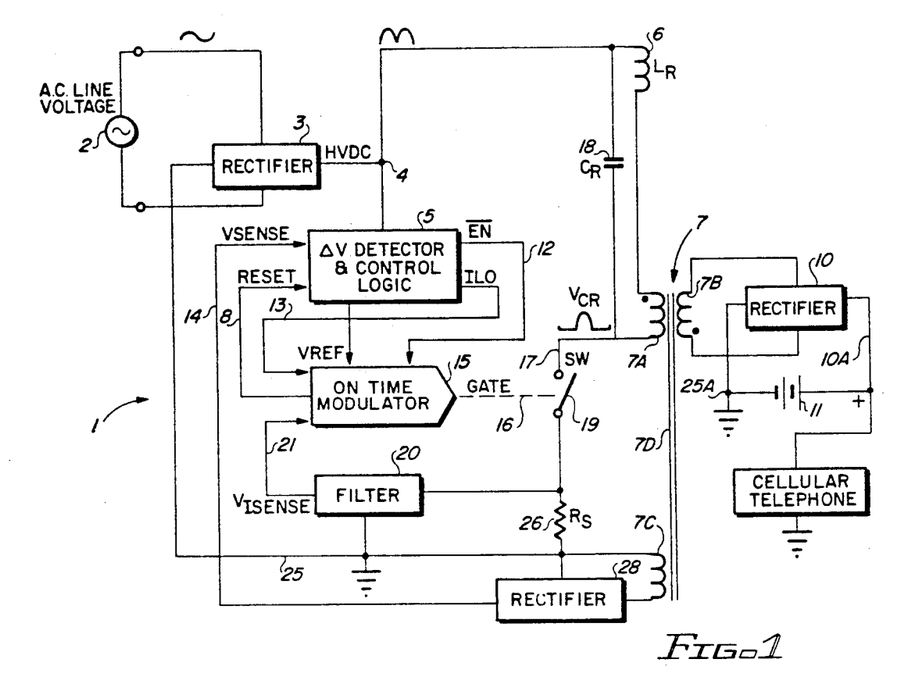
FIG. 1 is a block diagram of the battery charger of the present invention.

Referring to FIG. 1, battery charger circuit 1 receives AC line voltage 2 and rectifies it by means of a conventional full-wave rectifier 3 to produce the rectified HVDC (High Voltage DC) signal on its output conductor 4. Rectifier 3 has a ground terminal connected to a main ground conductor 25. Conductor 4 supplies HVDC to an input of a ΔV detector/control logic circuit 5 and also to one terminal of an inductance 6. Inductance 6 may be a discrete inductor, or it may be the leakage inductance of the primary winding 7A of a transformer 7.

Transformer 7 has a secondary winding 7B the terminals of which are connected to a half-wave rectifier 10. Rectifier 10 has a ground terminal connected to an "isolated" ground conductor 25A, and an output terminal 10A connected to the positive terminal of a nickel cadmium battery 11 to be charged.

Detector/control circuit 5 receives on conductor 14 a voltage $V_{SENSE}$ that accurately represents the present voltage of battery 11, and causes the charging rate of battery 11 to be decreased from a high current charging rate to a low current charging rate or trickle charge mode when a $V_{SENSE}$ voltage reduction or "droop" ΔV of the peak value 97 (FIG. 4) is detected. A signal RESET produced on conductor 8 by "on time" modulator circuit 15 is applied to an input of detector/control circuit 5, which produces an $\overline{EN}$ signal on conductor 12 and an ILO (low current charging mode) signal on conductor 13. Conductors 12 and 13 are applied to control inputs of modulator circuit 15. A voltage $V_{I-SENSE}$ produced in conductor 21 by filter circuit 20 is applied to a feedback input of modulator circuit 15.

Modulator circuit 15 produces an output signal on conductor 16 that controls the "on time" of a switch 19 so as to determine the charging rate of battery 11. Switch 19, when closed, conducts current flowing through primary winding 7A through conductor 17 into an input of filter circuit 20 and into resistor 26. A capacitor 18 having capacitance $C_R$ is connected between conductor 17 and HVDC conductor 4.

Transformer 7 has a ferrite core 7D which magnetically couples an additional secondary winding 7C to primary winding 7A. One terminal of secondary winding 7C is connected to main ground conductor 25, and the other terminal of inductor 7C is connected to an input of a half-wave rectifier 28. Rectifier 28 produces the voltage $V_{SENSE}$ on conductor 14.

Figure 2:
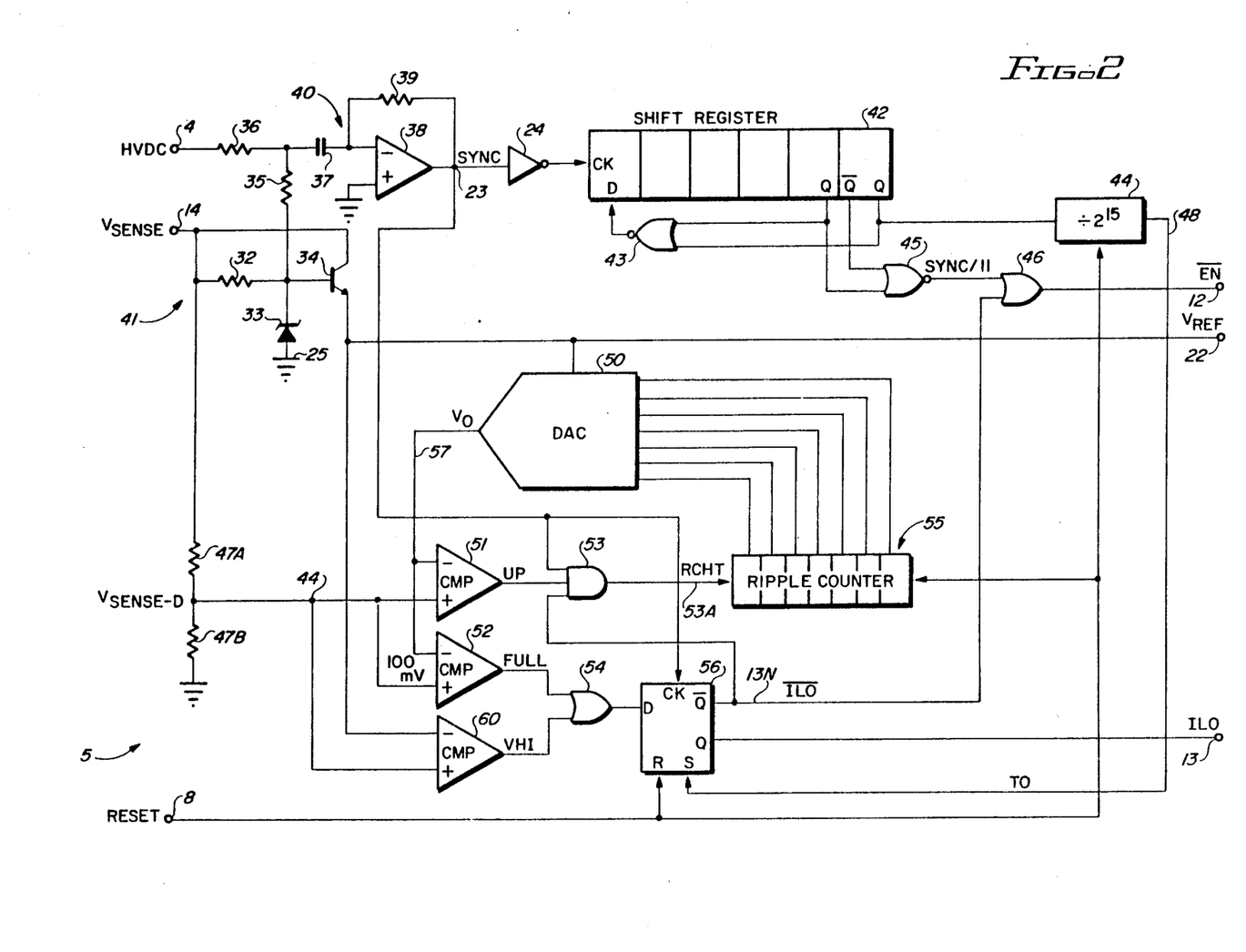
FIG. 2 is a logic diagram of part of the battery charger circuit of FIG. 1.

FIG. 2 shows the details of detector/control circuit 5. The signal HVDC on conductor 4 is applied via a resistive voltage divider 35,36 and a capacitor 37 to the inverting input of an operational amplifier 38, the output of which produces a timing signal SYNC on conductor 23. The non-inverting input of operational amplifier 38 is connected to ground conductor 25. Conductor 23 is connected through an inverter 24 to the input of one end of a shift register 42. Shift register 42 is comprised of six D type flip-flops. The Q output of the right hand flip-flop is connected to one input of a NOR gate 43 and to an input of a divider circuit 44 that divides that Q output signal by $2^{15}$. The $\overline{Q}$ output of the right hand flip-flop of shift register 42 is connected to one input of a two input NOR gate 45 which produces a signal SYNC/11 and applies it to the input of an OR gate 46. The Q output of the adjacent flip-flop of shift register 42 is connected to the other input of NOR gate 43 and to the other input of NOR gate 45. The output of OR gate 46 produces the signal $\overline{EN}$ on conductor 12.

The battery condition signal $V_{SENSE}$ on conductor 14 is applied to the collector of NPN transistor 34, to one terminal of resistor 32, and to one terminal of resistor 47A. The other terminal of resistor 32 is connected to one terminal of resistor 35 and to the cathode of a zener diode 33. The cathode of zener diode 33 also is connected to the base of NPN transistor 34. The anode of zener diode 33 is connected to the main ground conductor 25. The emitter of transistor 34 produces a constant reference voltage $V_{REF}$ equal to the breakdown voltage of zener diode 33 minus the $V_{BE}$ voltage of transistor 34 on conductor 22. Thus, current, an hence operating power supplied to $V_{REF}$ conductor 22 comes from $V_{SENSE}$ conductor 14 through the collector and emitter of transistor 34. $V_{REF}$ conductor 22 supplies current, and hence operating power, to DAC 50. Also, $V_{SENSE}$ conductor 14 supplies operating power to the circuitry including resistor 36 and capacitor 37. $V_{REF}$ conductor 22 is connected to the reference input of digital-to-analog (DAC) converter 50. Digital-to-analog converter 50 can be a Model DAC 7541 marketed by the assignee, although only 7 of the 12 bits are used.

$V_{REF}$ conductor 22 also is connected to the inverting input of a comparator 60. The non-inverting input of comparator 60 is connected via conductor 44 to the non-inverting input of a comparator 51, the inverting input of comparator 52, and to the junction between resistor 47A and a resistor 47B. The other terminal of resistor 47B is connected to main ground conductor 25.

The output of DAC 50 produces a voltage $V_O$ on conductor 57, which is connected to the inverting input of comparator 51 and the non-inverting input of comparator 52. Comparator 52 has a 100 millivolt input offset voltage.

The seven inputs of digital-to-analog converter 50 are connected to the outputs of a seven bit ripple counter 55. Ripple counter 55 is reset by the signal RESET generated by the circuit of FIG. 3. Divide-by-$2^{15}$ circuit 44 also is reset by the signal RESET. Ripple counter 55 is incremented by a signal RCHT ("ratchet") on conductor 53A by AND gate 53. One input of AND gate 53 is connected to SYNC signal conductor 23. Another input of AND gate 53 receives the signal UP from the output of comparator 51 to cause the output voltage $V_O$ of DAC 50 to "ratchet" higher. The remaining input of AND gate 53 receives the signal $\overline{ILO}$ on conductor 13N, which is connected to the $\overline{Q}$ output of a D type flip-flop 56. The signal $\overline{ILO}$ on conductor 13 also is applied to one input of OR gate 46. As subsequently will become apparent when the operation of the invention is described, DAC 50, ripple counter 55, AND gate 53 and comparator 51 co-act to produce a peak detect and hold function.

The clock input (CK) of flip-flop 56 is connected to SYNC conductor 23. The reset (R) input of flip-flop 56 is connected to RESET conductor 8. The set (S) conductor of flip-flop 56 receives the signal TO (time-out) produced on conductor 48 by divider circuits 42 and 44. The Q output of flip-flop 56 produces the signal ILO (low current charging mode) on conductor 13. The D input of flip-flop 56 is connected to the output of an OR gate 54, one input of which receives the signal FULL (indicating that battery 11 is fully charged) from the output of comparator 52. The other input of OR gate 54 receives the signal VHI (referring to a high voltage condition occurring because no battery is connected to charger circuit 1) produced at the output of comparator 60.

Figure 3:
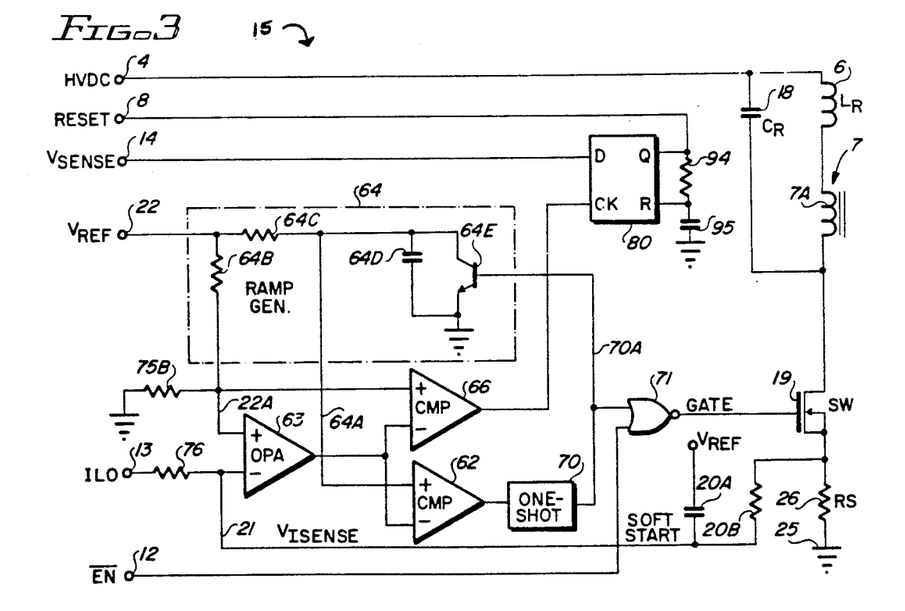
FIG. 3 is a detailed logic diagram of another part of the battery charger circuit of FIG. 1.

Referring next to FIG. 3, the details of on-time modulator circuit 15 and switch 19 are shown. The $V_{REF}$ voltage on conductor 22 is applied via a resistive voltage divider 64B,75B to the non-inverting input of error amplifier 63, the output of which is applied to the inverting input of comparator 66 and also to the inverting input of comparator 62. The non-inverting input of comparator 62 is connected to a ramp signal generator 64, which generates a 500 kilohertz ramp signal. Ramp generator circuit 64 is implemented by a circuit in which a constant current through resistor 64C flows charges up a capacitor 64D. One-shot 70 is triggered when the ramp voltage exceeds the output voltage of error amplifier 63. The one-shot resets the ramp to zero, and turns MOSFET 19 off. When one-shot 70 times out, it restarts ramp generator 64 by turning off transistor 64E.

The "divided down" representation of $V_{REF}$ appearing on conductor 22A is applied to the non-inverting input of error amplifier 63. The inverting input of error amplifier 63 is connected by resistor 76 to the ILO signal on conductor 13.

The output of comparator 62 is connected to the input of one microsecond one-shot circuit 70, the output of which is connected to one input of NOR gate 71. The other input of NOR gate 71 is connected by conductor 12 to receive the signal $\overline{EN}$. The output of NOR gate 71 produces the signal GATE and applies it to the gate electrode of N channel MOSFET 19, the drain of which is connected to a lower terminal of secondary winding 7A and to the lower terminal of capacitor 18. The source of MOSFET 19 is connected by resistor 26 to ground conductor 25. The source of MOSFET 19 also is connected by resistor 20B to $V_{ISENSE}$ conductor 21 to the inverting input of operational amplifier 63. Resistor 20B and capacitor 20A constitute filter 20 of FIG. 1.

$V_{SENSE}$ conductor 14 is connected to the D input of D type flip-flop 80. The clock input of flip-flop 80 is connected to the output of comparator 66. The Q output of flip-flop 80 is connected by RESET conductor 8 to one terminal of resistor 94. The other terminal of resistor 94 is connected to the reset input of flip-flop 80 and to one terminal of capacitor 95, the other terminal of which is connected to main ground conductor 25.

A RESET pulse is generated by either a power turn on condition or a battery load condition. During power turn on, the soft start capacitor 20A initially causes the output of error amplifier 63 to be low, resulting in an initial minimum on time for switch 19 and a clock edge to flip-flop 80 from comparator 66. Resistor 94 and capacitor 95 determine the width of the RESET pulse.

During a battery load condition, $V_{ISENSE}$ rises, causing the output of operational amplifier 63 to fall below the divided down reference voltage $V_{SENSE-D}$, causing a clock edge to initiate the RESET pulse as described for a power turn on condition.

Figure 4:
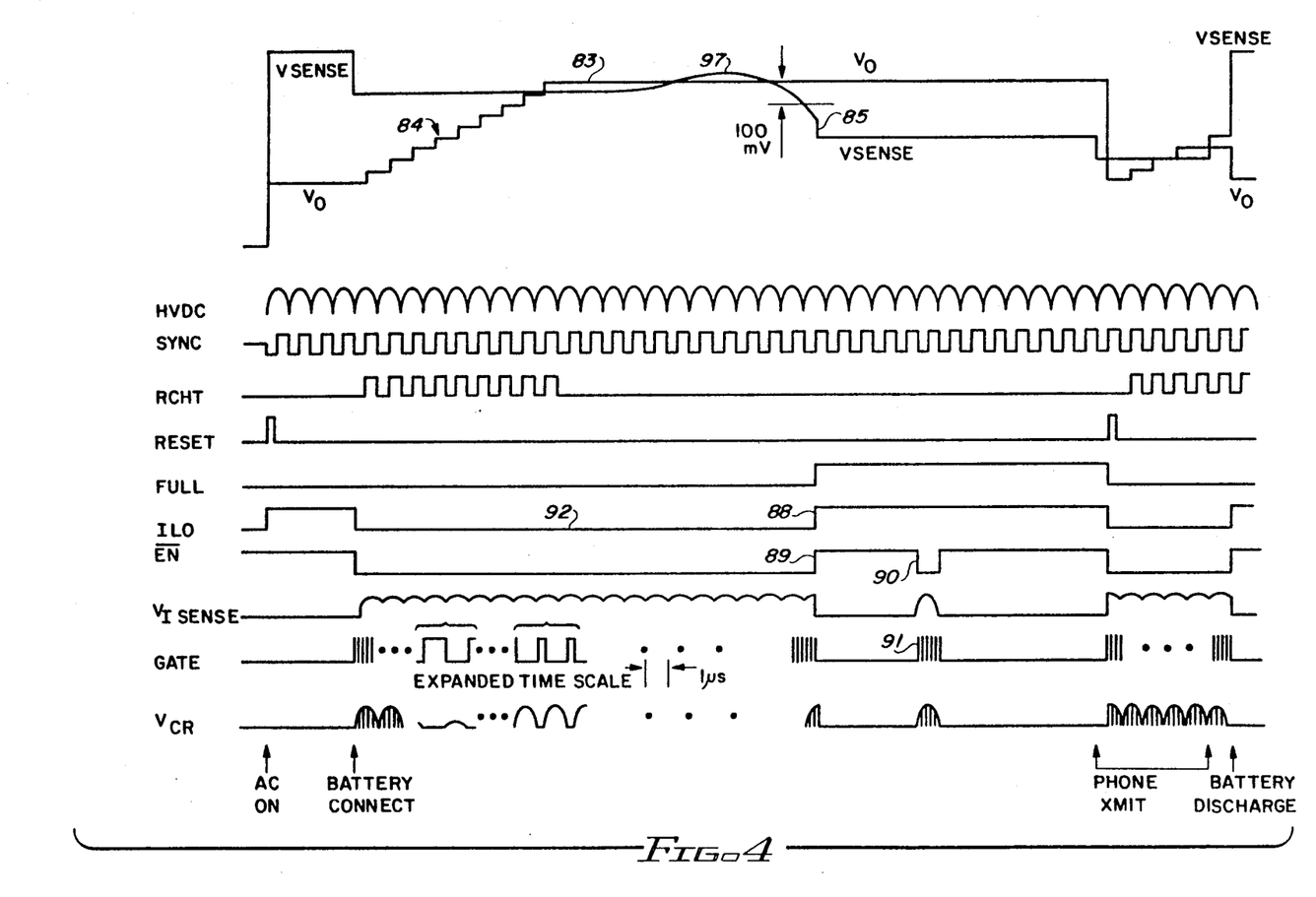
FIG. 4 is a timing diagram useful in describing the operation of the circuit of FIGS. 1-3.

The basic operation of battery charger 1 is that the 60 hertz, 120 volt AC line voltage is rectified by full wave rectifier 3 to produce the sinusoidal HVDC waveform shown in FIG. 4. This waveform is input to the differentiating circuit 40 (FIG. 2) to produce the SYNC signal shown in FIG. 4. The leading edge of each SYNC pulse occurs at a maximum value of HVDC, i.e., at the middle of each rectified half wave. The trailing edge of each SYNC pulse occurs at a minimum value of HVDC.

The SYNC signal is applied to the input of AND gate 53 and D type flip-flop 56 (FIG. 2). The seven bit ripple counter 55 is reset by the signal RESET. If battery charger 1 is in its high current mode, $\overline{ILO}$ is a "1" enabling SYNC to produce the RCHT signal on conductor 53A, causing stepwise incrementing of $V_O$ as indicated by numeral 84 in FIG. 4. When $V_O$ exceeds $V_{SENSE-D}$ on conductor 44, comparator 51 causes the signal UP to go to zero, disabling SYNC from producing the RCHT signal. When $\overline{ILO}$ goes to a "0" as a result of a FULL="1" signal being applied by comparator 52 to an input of NOR gate 54, the SYNC signal is disabled, so ripple counter 55 is no longer incremented, and the analog signal $V_O$ produced by DAC 50 stops at level 83 in FIG. 4.

In accordance with the present invention, ratchet DAC 50 accurately holds level 83 until it is reset. Thus, RCHT is produced only while DAC 50 is being incremented, and flip-flop 56 then indicates either that the battery is fully charged or the battery is not connected. In either case, the Q output of flip-flop 56 forces the circuit into a low charging current mode.

If charger circuit 1 is not connected to battery 11, the voltage $V_{SENSE}$ obviously will increase to a high value, as the output current of battery charger 1 has nowhere to flow. Comparator 60 detects this condition and sets the signal VHI (voltage high) to a "1", forcing flip-flop 56 to establish a low current or trickle current charging mode. (The reason that it is desirable for battery charger circuit 1 to go into the low current mode if no battery is connected to the charger is because it is desirable to avoid wasteful power dissipation in the transformer.

The FULL signal goes to a "1" to indicate that the battery has been fully charged when the voltage $V_{SENSE-D}$ has "drooped" or fallen more than approximately 100 millivolts, as indicated by numeral 85 in FIG. 4, at which point $V_O$ exceeds $V_{SENSE-D}$ by more than the 100 millivolt offset of comparator 52.

The inverting input of comparator 60 receives the $V_{REF}$ voltage on conductor 22, which is compared to $V_{SENSE-D}$. A high value of $V_{SENSE}$ produced by winding 7C and rectifier 28 under a "no load" condition on conductor 10A results in VHI going from a "0" to a "1", setting flip-flop 56, and initiating low current mode operation.

The voltage $V_{SENSE}$ produced by rectifier 28 (FIG. 1) has two functions, one being to accurately represent the battery voltage if a battery is connected, and the other being to supply power to the detector, controller, and modulator circuits.

Shift register 42 performs a divide-by-11 function. Divide-by-11 shift register 42 and a separate divide-by-$2^{15}$ circuit 44 generate a time out (TO) signal on conductor 48 that performs a "fail safe" function of setting the battery charger to a low current charging mode after one hour of high current charging operation. The divide circuits 42 and 44 divide the 60 hertz line frequency down enough to produce the signal TO after one hour. Shift register 42 and NOR gate 43 are configured as a so-called "walking ring" counter which performs the divide-by-11 function needed in conjunction with the divide-by-$2^{15}$ function to obtain the one hour delay by division of the 60 hertz line frequency.

Divide-by-11 shift register 42 performs a second function, which is to implement the low current mode operation by producing an enable pulse on conductor 12 every eleventh SYNC pulse. The $\overline{EN}$ signal on conductor 12 is gated by the $\overline{ILO}$ signal on conductor 13N. The rising edge 88 (FIG. 4) of ILO results in a corresponding falling edge of $\overline{ILO}$ that gates the SYNC/11 signal through OR gate 46 to produce $\overline{EN}$. The SYNC/11 signal is a "0" every eleventh SYNC pulse, and is a "1" the rest of the time. The $\overline{EN}$ signal therefore has a "0" value indicated by numeral 90 in FIG. 4 during the SYNC/11 pulse if $\overline{ILO}$ is positive. The output of one-shot circuit 70 produces pulses that are gated through NOR gate 71 by $\overline{EN}$ as shown in FIG. 3, producing the burst of GATE pulses indicated by numeral 91 during every eleventh SYNC pulse. This turns MOSFET switch 19 on and off at approximately the 500 kilohertz rate and thereby causing the trickle current or low current charging.

The widths of the GATE pulses during the high current mode, when ILO is a "0" as indicated by numeral 92 in FIG. 4, and is determined by circuitry in the on-time modulator 15, as shown in detail in FIG. 3.

The voltage on the $V_{ISENSE}$ conductor 21 is an analog voltage which is initiated by the source electrode of MOSFET switch 19 at the frequency of on time modulator 15 (which is a frequency of about 500 kilohertz). The high frequency component is filtered out of this by filter 20. At each peak value of HVDC there is a peak of current and of $V_{ISENSE}$, and at each minimum or valley of HVDC there is a minimum of current $V_{ISENSE}$. This results in the "ripple" appearance of $V_{ISENSE}$ in FIG. 4

$V_{ISENSE}$ is fed back to the input of on-time modulator 15 to force the ripple of $V_{ISENSE}$ to be as small as possible. This is accomplished by having a maximum on-time for switch 19 during the valleys of HVDC, and a minimum on-time for switch 19 during the peaks of HVDC. A maximum fifty percent duty cycle is indicated in the expanded time scale portion of the GATE signal at the valleys of HVDC in FIG. 4. The much smaller duty cycle corresponds to the peaks of HVDC. The duty cycle of GATE during the high charging current mode operation varies continuously between these extremes over every half cycle of the line voltage. This has the effect of maximizing the total power output of the battery charger circuit 1 while preventing the drain-to-source breakdown voltage of MOSFET 19 from being exceeded.

It should be appreciated that the "flyback" voltage $V_{CR}$ on conductor 17 (FIG. 1) can be approximately one thousand volts or more when switch 19 is turned off while a large current is flowing in primary winding 7A.

More specifically, at the peaks of HVDC, the drain-to-source breakdown voltage of MOSFET 19, which typically might be 1000 volts, would be exceeded if the on time of MOSFET 19 has a 50 percent duty cycle value at that time. It should be appreciated that if the on time of MOSFET 19 is set to a constant smaller value which avoids the condition of $V_{CR}$ exceeding a thousand volts, then less power would be delivered to secondary winding 7B, rectifier 10, and battery 11 during the "valleys" of HVDC than if MOSFET 19 is on for a long time.

In accordance with the present invention, the on time of MOSFET 19 is continuously modulated by $V_{ISENSE}$ in order to achieve maximum power coupled across transformer 7 without exceeding the breakdown voltage of MOSFET 19. Furthermore, continuous modulation of the on time of MOSFET 19 provides a mechanism to keep the charger output current constant as the battery voltage rises and as transformer inductance and/or loss changes with ambient temperature. Furthermore, the current control provides a maximum current limit to protect the charger from defective (e.g., shorted) cells in the battery pack.

Error amplifier 63 amplifies the difference voltage between $V_{ISENSE}$ conductor 21 and the divided-down reference voltage $V_{SENSE-D}$ on conductor 22A. Its output goes to an input of comparator 62 and completes a feedback loop in such a way as to minimize the difference in voltage between conductors 21 and 22A. An increase in this difference results in an increase in the output voltage of amplifier 63 such that the ramp generator voltage takes longer (i.e., greater switch on time) before causing comparator 62 to switch. Thus, the longer on time of switch 19 increases the average primary current which opposes the initial difference voltage.

Ramp generator circuit 64 produces a ramp signal at a rate of about 500 to 1000 kilohertz to provide a modulating signal that is used to convert the voltage produced by error amplifier 63 into a time delay that actuates one-shot 70 and also represents the on time of MOSFET 19. One-shot circuit 70 determines the widths of the "0" level portions of the GATE waveform and hence the "off time" of MOSFET switch 19. The off time of MOSFET switch 19 is constant regardless of what the modulator circuit 15 does to the "on time" of MOSFET switch 19. The point at which the 500 kilohertz ramp signal produced on conductor 64A exceeds the output voltage produced by error amplifier 63 determines the width of the "1" portions of the GATE waveform and hence the "on time" of MOSFET 19. When one-shot 70 times out, the signal on conductor 70A resets the output of ramp generator 54 as explained above and the ramp signal is repeated.

The timeout duration of one-shot 70, which is equal to the off time of MOSFET 19, is designed to be equal to one-half of the period of the resonant frequency established by the transformer primary winding inductance $L_R$ and the resonant capacitor $C_R$. The primary flyback voltage $V_{CR}$ therefore has a half sine waveform returning to zero before MOSFET 19 is turned on for the next cycle. Thus, the power loss in MOSFET switch 19 is minimized, and noise generated by the flyback waveform $V_{CR}$ is concentrated at the resonant frequency of about 500 kilohertz, with less energy at higher multiples of the frequency than would be the case for a flyback voltage with a non-sinusoidal shape. This results in "zero voltage switching" of MOSFET 19, so it is turned on when there is zero voltage (drain-to-source) across it.

The on time of MOSFET 19 is modulated by the feedback voltage $V_{ISENSE}$ which represents the amount of current flowing in primary winding 7A.

The modulation of the on time of MOSFET 19 by means of the feedback voltage $V_{ISENSE}$ (which represents the current in primary winding 7A) results in minimum power dissipation in MOSFET 19, and essentially eliminates switching transients, which, if present, would produce undesirable electrical noise that might interfere with operation of communications equipment connected to battery 11 or in its vicinity while it is being charged.

The $V_{ISENSE}$ waveform contains several components, including a DC component that represents the average power in primary winding 7A, and an AC component that represents the switching frequency (about 500 to 1000 kilohertz) of MOSFET 19, and another AC component at the 60 hertz line frequency that appears as ripple, as an envelope of $V_{ISENSE}$. This envelope signal is compared by comparator 62 with the ramp signal on conductor 64A of FIG. 3 to produce the on time modulation of the GATE waveform.

The intervals during which MOSFET switch 19 is off is related by the expression $$T_{off} = \pi \sqrt{L_R C_R}.$$

to primary winding inductance $L_R$ and resonant capacitance $C_R$.

HVDC energizes the primary winding of the transformer. The power to the modulator is supplied from the $V_{SENSE}$ line.

RESET signal 8 is used to reset flip-flop 56, the ripple counter for the ratchet DAC, and the hour timer that generates the time-out signal TO.

The technique of using ratchet DAC 50 and associated circuitry might be replaced by a peak detect and hold circuit in combination with circuitry that would compare the peak detect and hold circuit output voltage with the instantaneous battery voltage to determine whether the "droop" characteristic of achieving a fully charged battery condition has occurred; the results of that comparison then could be used to establish a low current charging mode.

The $V_{ISENSE}$ voltage alternatively could be implemented by means of an additional transformer, the primary winding of which conducts the current also flowing in primary winding 7A. A secondary winding of the additional transformer would generate a signal indicative of current flowing through primary winding 7A.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A battery charger comprising in combination:
   (a) a first rectifier receiving a line voltage and producing a rectified sinusoidal voltage;
   (b) a transformer having a primary winding coupled to receive the rectified sinusoidal voltage and first and second secondary windings, a second rectifier being coupled between terminals of the first secondary winding and terminals of a battery;
   (c) a switch coupled between a terminal of the primary winding and means for producing a signal indicative of current flowing through the switch and primary winding;
   (d) first means coupled to terminals of the second secondary winding for producing a battery condition voltage representative of a voltage between the terminals of the battery;
   (e) peak detect and hold means coupled to receive a voltage proportional to the battery condition voltage and detect and hold a peak value thereof;
   (f) second means for comparing an output voltage of the peak detect and hold means with the voltage proportional to the battery condition voltage to produce a charging mode signal when the voltage proportional to the battery condition voltage falls a predetermined threshold voltage below the output voltage of the peak detect and hold means; and
   (g) third means coupled to receive the charging mode signal and the signal indicative of current flowing through the primary winding for producing a control signal applied to the switch to control flow of current through the primary winding in accordance with the battery condition voltage, the third means including means for producing a constant turn off time for the switch and means for varying turn on time for the switch in response to the signal indicative of current flowing through the primary winding.

2. The battery charger of claim 1 including second means responsive to the rectified sinusoidal voltage for producing a timing signal, wherein the peak detect and hold means includes a DAC having an output coupled to a first input of a first comparator, a ripple counter having outputs coupled to digital inputs of the DAC, and a gate circuit having an output coupled to a toggle input of the ripple counter, an output of the first comparator being coupled to a first input of the gate circuit, a second input of the gate circuit being coupled to receive the timing signal.

3. The battery charger of claim 2 wherein the second means includes a second comparator having a first input coupled to the output of the DAC, a second input coupled to receive the voltage proportional to the battery condition voltage, and an output coupled to an input of a flip-flop clocked by the timing signal, the second comparator having an input offset voltage equal to the predetermined threshold voltage, to produce the charging mode signal at an output of the flip-flop.

4. The battery charger of claim 3 wherein the switch includes a MOSFET, and the means for producing the signal indicative of current includes a resistor connected in series with the MOSFET to produce the signal indicative of current across the resistor.

5. The battery charger of claim 3 wherein the first means includes a rectifier coupled between terminals of the second secondary winding, the battery condition voltage being produced at an output of the rectifier.

6. The battery charger of claim 4 wherein the means for producing a constant turn off time includes a one-shot circuit, and the means for varying turn on time includes an amplifier having an input connected to receive the signal indicative of current, a comparator having one input connected to receive a ramp signal and another input coupled to an output of the amplifier, and an output coupled to trigger the one-shot circuit, an output of the one-shot circuit being coupled to apply the control signal to a gate electrode of the MOSFET.

7. The battery charger of claim 6 including dividing means responsive to the timing signal for producing a first signal that has a duration equal to that of a pulse of the timing signal each time a predetermined number of pulses of the timing signal have occurred, and a first gating circuit means for gating the first signal with the charging mode signal and the output of the one-shot circuit to produce the control signal, whereby the control signal has a greatly reduced duty cycle when the charging mode signal is at a low charging current state.

8. The battery charger of claim 6 including a ramp generator generating the ramp signal and means for resetting the ramp generator each time the one-shot circuit times out.

9. The battery charger of claim 1 wherein the means for producing a constant turn off time includes a one-shot circuit, and the means for varying turn on time includes an amplifier having an input connected to receive the signal indicative of current, a comparator having one input connected to receive a ramp signal, another input coupled to an output of the amplifier, and an output coupled to trigger the one-shot circuit, and means coupled to an output of the one-shot circuit for applying the control signal to a control electrode of the switch.

10. The battery charger of claim 9 wherein the primary winding of the transformer is connected to a capacitor to resonate at a first frequency, the one-shot circuit times out after an interval equal to approximately one-half of the period of the first frequency to turn on the switch at times when voltage across the switch is approximately zero, to prevent generation of electrical noise.

11. The battery charger of claim 1 wherein the battery is connected to power a noise-sensitive circuit being operated during charging of the battery by the battery charger, whereby low noise operation of the battery charger avoids noise-caused errors in operation of the noise-sensitive circuit.

12. The battery charger of claim 1 wherein the means for varying turn on time varies the turn on time of the switch so that current flowing through the primary winding is stabilized while the rectified sinusoidal voltage varies with time, thereby effectuating maximum transfer of power to the battery while limiting flyback voltage of the primary winding.

13. The battery charger of claim 2 wherein the first means is connected to apply the battery condition voltage to the peak detect and hold means, the third means, and the fourth means to supply operating power thereto.

14. A battery charger comprising in combination:
(a) a first rectifier receiving a line voltage and producing a rectified sinusoidal voltage;
(b) a transformer having a primary winding coupled to receive the rectified sinusoidal voltage and first and second secondary windings, a second rectifier being coupled between terminals of the first secondary winding and terminals of a battery;
(c) a switch coupled between a terminal of the primary winding and means for producing a signal indicative of current flowing through the primary winding;
(d) first means coupled to terminals of the second secondary winding for producing a battery condition voltage representative of a voltage between the terminals of the battery;
(e) second means responsive to the rectified sinusoidal voltage for producing a timing signal;
(f) a ratchet DAC;
(g) third means coupled to an output of the ratchet DAC for comparing an output voltage of the ratchet DAC to a voltage proportional to the battery condition voltage and producing an incrementing signal synchronized with the timing signal to increment the ratchet DAC until the ratchet DAC output voltage exceeds the voltage proportional to the battery condition voltage;
(h) fourth means coupled to the output of the ratchet DAC for producing a low charging mode signal when the reference voltage falls a predetermined threshold voltage below the DAC output voltage;
(i) fifth means coupled to receive the low charging mode signal and the signal indicative of current flowing through the primary winding for producing a control signal applied to the switch to control flow of current through the primary winding in accordance with the battery condition voltage.

15. A method of charging a battery using a battery charger, comprising the steps of:
(a) rectifying an AC line voltage to produce a sinusoidal rectified voltage and applying it to a primary winding of a transformer, the transformer having first and second secondary windings, a rectifier being coupled between terminals of the first secondary winding and terminals of a battery to supply a rectified charging current to the battery;
(b) operating a switch coupled between a terminal of the primary winding to control current through the primary winding;
(c) producing a signal indicative of primary winding current;
(d) producing a battery condition voltage between terminals of the second secondary winding, the battery condition voltage being representative of voltage between the terminals of the battery;
(e) detecting and storing a peak value of a reference voltage proportional to the battery condition voltage;
(f) comparing the stored peak value with the voltage proportional to the battery condition voltage to produce a charging mode signal with a low charging mode state when the voltage falls a predetermined threshold voltage below the peak value; and
(g) controlling flow of current through the switch by turning the switch off for constant times and turning the switch on for times which vary in response to the signal indicative of the primary winding current.

16. The method of claim 15 including turning the switch off for constant times by triggering a one-shot circuit having an output coupled to a control electrode of the switch, a time-out interval of the one-shot circuit being equal to the constant times.

17. The method of claim 16 including turning the switch on by comparing a ramp signal with the signal indicative of the primary winding current and triggering the one-shot circuit when the ramp signal exceeds the signal indicative of primary winding current.

18. The method of claim 15 including producing a timing signal in response to the sinusoidal rectified voltage, producing a first signal each time a predetermined number of pulses of the timing signal have occurred, and gating the first signal with the output of the one-shot circuit and the charging mode signal to control the gate electrode of the switch, whereby a substantially reduced duty cycle occurs for turning the switch on and off during a low current charging mode of the battery charger.

19. The method of claim 18 including detecting and storing the peak value by producing an incrementing signal synchronized with the timing signal to increment a ratchet DAC until an output voltage of the ratchet DAC exceeds the reference voltage proportional to the battery condition voltage and producing the charging mode signal with the low charging mode state when the battery condition voltage falls a predetermined threshold voltage below the DAC output voltage.

20. The method of claim 17 including resonating the primary winding at a first frequency, and operating the one-shot circuit to time out in an interval equal to one-half of the period of first frequency, and resetting the ramp signal each time the one-shot circuit is triggered.

21. The method of claim 17 including varying the turn on time of the switch to stabilize the primary winding current as the rectified sinusoidal voltage varies with time to effect maximum transfer of power to the battery while limiting flyback voltage of the primary winding.

22. A battery charger comprising in combination:

(a) a first rectifier receiving a line voltage and producing a rectified sinusoidal voltage;
(b) a transformer having a primary winding coupled to receive the rectified sinusoidal voltage and first and second secondary windings, a second rectifier being coupled between terminals of the first secondary winding and terminals of a battery;
(c) a switch coupled between a terminal of the primary winding and means for producing a signal indicative of current flowing through the switch and primary winding;
(d) first means coupled to terminals of the second secondary winding for producing a battery condition voltage representative of a voltage between the terminals of the battery;
(e) peak detect and hold means coupled to receive a voltage proportional to the battery condition voltage and detect and hold a peak value thereof;
(f) second means for comparing an output voltage of the peak detect and hold means with the reference voltage to produce a charging mode signal when the voltage proportional to the battery condition voltage falls a predetermined threshold voltage below the output voltage of the peak detect and hold means; and
(g) third means coupled to receive the charging mode signal and the signal indicative of current flowing through the primary winding for producing a control signal applied to the switch to control flow of current through the primary winding in accordance with the battery condition voltage.

* * * * *